(12) United States Patent
Lin

(10) Patent No.: US 12,250,701 B2
(45) Date of Patent: Mar. 11, 2025

(54) USER EQUIPMENT AND METHOD FOR HYBRID AUTOMATIC REPEAT REQUEST REPORTING

(71) Applicant: GUANGDONG OPPO MOBILE TELECOMMUNICATIONS CORP., LTD., Dongguan (CN)

(72) Inventor: Huei-Ming Lin, South Yarra (AU)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 292 days.

(21) Appl. No.: 17/731,568

(22) Filed: Apr. 28, 2022

(65) Prior Publication Data

US 2022/0256504 A1   Aug. 11, 2022

Related U.S. Application Data

(63) Continuation of application No. PCT/CN2020/124711, filed on Oct. 29, 2020.
(Continued)

(51) Int. Cl.
*H04W 72/30* (2023.01)
*H04L 5/00* (2006.01)

(52) U.S. Cl.
CPC ........... *H04W 72/30* (2023.01); *H04L 5/0055* (2013.01)

(58) Field of Classification Search
CPC .... H04W 72/30; H04L 5/0055; H04L 1/1829; H04L 1/1861; H04L 5/0007; H04L 1/1864
See application file for complete search history.

(56) References Cited

U.S. PATENT DOCUMENTS

2013/0163535 A1* 6/2013 Anderson ............. H04L 1/0041
370/329
2017/0295601 A1 10/2017 Kim et al.
(Continued)

FOREIGN PATENT DOCUMENTS

WO   2019128418 A1   7/2019
WO   2019157683 A1   8/2019
(Continued)

OTHER PUBLICATIONS

The First Examination Report dated Sep. 14, 2022 from Indian patent Application No. 202227026574.
(Continued)

*Primary Examiner* — Dinh Nguyen
(74) *Attorney, Agent, or Firm* — BAYES PLLC

(57) ABSTRACT

A user equipment (UE) and a method for a hybrid automatic repeat request (HARQ) reporting are provided. The method includes determining, by the UE, a hybrid automatic repeat request (HARQ) information in response to one or more transport blocks (TBs) in a received physical sidelink shared channel (PSSCH) in a resource pool and selecting a sequence cyclic shift for the HARQ information in a physical sidelink feedback channel (PSFCH) transmission in the resource pool, wherein the sequence cyclic shift is generated according to a pre-configured or network configured initial cyclic shifting value. This can solve issues in the prior art, require a smaller number of information bits to be encoded,
(Continued)

require reduced number of required sequences to represent ACK/NACK information, provide better user experience, provide a good communication performance, and/or provide high reliability.

9 Claims, 4 Drawing Sheets

Related U.S. Application Data

(60) Provisional application No. 62/928,221, filed on Oct. 30, 2019.

(56) References Cited

U.S. PATENT DOCUMENTS

| | | | | |
|---|---|---|---|---|
| 2020/0029340 | A1* | 1/2020 | He | H04W 72/56 |
| 2020/0154437 | A1* | 5/2020 | Lin | H04L 1/1642 |
| 2020/0228247 | A1* | 7/2020 | Guo | H04L 5/0048 |
| 2021/0385804 | A1* | 12/2021 | Ye | H04L 5/0048 |
| 2022/0224491 | A1* | 7/2022 | Salim | H04L 1/1861 |

FOREIGN PATENT DOCUMENTS

| | | |
|---|---|---|
| WO | 2019192355 A1 | 10/2019 |
| WO | 2019197025 A1 | 10/2019 |

OTHER PUBLICATIONS

The partial supplementary European search report dated Oct. 20, 2022 from European patent Application No. 2 20882431.8.
CATT, "Discussion on physical layer structure in NR V2X", 3GPP Draft; R1-1901992, Feb. 16, 2019 (Feb. 16, 2019), the whole document.
LG Electronics, "Discussion on physical layer procedures for NR sidelink", 3GPP Draft; R1-1910783, Oct. 8, 2019 (Oct. 8, 2019), the whole document.
The supplementary European search report dated Feb. 28, 2023 from European patent Application No. 20882431.8.
OPPO: "Physical layer procedure for NR-V2X sidelink", 3GPP Draft; R1-1910375 PHY Layer Procedure, 3rd Generation Partnership Project (3GPP), Mobile Competence Centre ; 650, Route Des Lucioles ; F-06921 Sophia-Antipolis Cedex ; France; Oct. 8, 2019 (Oct. 8, 2019), the whole document.
International Search Report and Written Opinion Dated Jan. 29, 2021 from PCT Application No. PCT/CN2020/124711, 9 pages.
ITL, "Physical layer structure for NR V2X", 3GPP TSG RAN WG1 #98bis R1-1910796, Oct. 20, 2019 (Oct. 20, 2019), section 5, 8 pages.
The Hearing Notice dated Oct. 25, 2024 from Indian patent application No. 202227026574.

* cited by examiner

USER EQUIPMENT AND METHOD FOR HYBRID AUTOMATIC REPEAT REQUEST REPORTING

CROSS REFERENCE TO RELATED APPLICATIONS

This is a continuation application of International Application No. PCT/CN2020/124711, filed on Oct. 29, 2020, entitled "USER EQUIPMENT AND METHOD FOR HYBRID AUTOMATIC REPEAT REQUEST REPORTING", which claims priority to U.S. Provisional Application No. 62/928,221 filed on Oct. 30, 2019, both of which are incorporated herein by reference in their entireties.

BACKGROUND

The present disclosure relates to the field of communication systems, and more particularly, to a user equipment (UE) and a method for a hybrid automatic repeat request (HARQ) reporting, which can provide a good communication performance and/or provide high reliability.

In the development of direct device-to-device (D2D) communication under the 3rd generation partnership project (3GPP), also called sidelink (SL) technology, reliability requirement to successfully deliver safety related message packets for advanced driving use cases over the direct radio link is extremely high (e.g. up to 99.999%). In order to meet this stringent radio requirement, the next generation of SL technology to be based on the latest 5G new radio (NR) standards will incorporate a new hybrid automatic repeat request (HARQ) feature to improve not just the reliability part of the radio link, but also aim to shorten the latency of delivering the packet transport block (TB) and minimize SL resource usage.

However, it is expected that the new HARQ feedback reporting directly from a receiving user equipment (Rx-UE) to a packet transmitting UE (Tx-UE) over the SL will not be applicable and useful in all communication scenarios. That is, the HARQ reporting feature should only be used in 3 specific scenarios and cast type communications, acknowledgement (ACK)/negative acknowledgement (NACK) feedback in unicast (UC) communication from the packet Rx-UE, NACK-only feedback in connection-less groupcast (CL-GC) from unknown number of Rx-UE(s), and ACK/NACK feedback in connection-oriented groupcast (CO-GC) from a fixed/deterministic number of Rx-UEs within a SL group.

To facilitate the feedback of HARQ reports, a new physical sidelink feedback channel (PSFCH) will be introduced in NR-SL design for Rx-UE(s) to send ACK/NACK results. Based on the current progress of NR-SL technology development in 3GPP, the time length for PSFCH likely to occupy only one symbol at the end of a slot and the periodicity of PSFCH occurrence (N) in terms of number of slots within a resource pool can be configured to be 0 (no PSFCH at all), 1, 2, or 4. Furthermore, the minimum time gap (K) between a physical side link shared channel (PSSCH) transmission and its associated PSFCH for HARQ feedback will be at least 2 slots. This means the quickest time a Rx-UE should send its HARQ report after receiving PSSCH transmission from a Tx-UE in the above three reporting scenarios is 2 slots.

FIG. 1 illustrates an example illustration of physical sidelink feedback channel (PSFCH) resources configured in a resource pool with N equal to 4 and K equal to 2. FIG. 1 illustrates that, in some embodiments, an example of how PSFCH would be placed within a resource pool when N equal to 4 and K equal to 2 is illustrated. For PSSCH transmissions in slots (n−5), (n−4), (n−3) and (n−2), the corresponding PSFCH transmission opportunity would be in slot (n) in order to satisfy the K=2 constraint. That is, a PSFCH slot should carry HARQ feedback reports for 4 slots if N is configured to be 4. As such, multiplexing of HARQ feedback reports for multiple PSSCH transmission slots would be necessary when N is greater than 1. Therefore, the first main issue associated with PSFCH design is the ability to multiplex and the resource capacity to accommodate HARQ reports for different cast types of SL transmission, multiple slots and multiple UEs per PSSCH transmission/slot. The second main issue is the short processing time of K=2 slots for a Rx-UE to receive and decode PSCCH/PSSCH data information, generate a HARQ report based on the decoding outcome, encode and modulate the HARQ report, and to switch from Rx mode to Tx mode for transmitting the final HARQ report in a radio frequency (RF) signal.

FIG. 1 illustrates that, in some embodiments, if the frequency size for a PSSCH sub-channel (SC) is 10 RBs due to automatic gain control (AGC) training time requirement, this means the amount of frequency resources for the corresponding PSFCH is also at most 10 RBs. When considering the number of UEs per CO-GC session can be up to 20 (i.e., 19 UEs could be simultaneously sending ACK/NACK reports) and a PSFCH should support up to 4 CO-GC PSSCH transmissions per HARQ reporting window (N=4), it seems the amount of available resources for PSFCH within a SC is quite limited and insufficient. How to solve the above issues is still a challenge.

Therefore, there is a need for a user equipment (UE) and a method for a hybrid automatic repeat request (HARQ) reporting, which can solve issues in the prior art, require a smaller number of information bits to be encoded, require reduced number of required sequences to represent ACK/NACK information, provide better user experience, provide a good communication performance, and/or provide high reliability. Further, Therefore, a design of PSFCH format should be efficient (that is easy to generate and encode), able of represent different HARQ states (ACK or NACK), and capable of multiplexing HARQ reports from multiple UEs and for different slots.

SUMMARY

An object of the present disclosure is to propose a user equipment (UE) and a method for a hybrid automatic repeat request (HARQ) reporting, which can solve issues in the prior art, require a smaller number of information bits to be encoded, require reduced number of required sequences to represent ACK/NACK information, provide better user experience, provide a good communication performance, and/or provide high reliability.

In a first aspect of the present disclosure, a user equipment (UE) includes a memory, a transceiver, and a processor coupled to the memory and the transceiver. The processor is configured to determine a hybrid automatic repeat request (HARQ) information in response to one or more transport blocks (TBs) in a received physical sidelink shared channel (PSSCH) in a resource pool. The processor is configured to select a sequence cyclic shift for the HARQ information in a physical sidelink feedback channel (PSFCH) transmission in the resource pool, wherein the sequence cyclic shift is generated according to a pre-configured or network configured initial cyclic shifting value.

In a second aspect of the present disclosure, a method for hybrid automatic repeat request (HARQ) reporting of a user equipment includes determining, by the UE, a hybrid automatic repeat request (HARQ) information in response to one or more transport blocks (TBs) in a received physical sidelink shared channel (PSSCH) in a resource pool and selecting a sequence cyclic shift for the HARQ information in a physical sidelink feedback channel (PSFCH) transmission in the resource pool, wherein the sequence cyclic shift is generated according to a pre-configured or network configured initial cyclic shifting value.

In a third aspect of the present disclosure, a user equipment (UE) includes a memory, a transceiver, and a processor coupled to the memory and the transceiver. The transceiver is configured to receive a hybrid automatic repeat request (HARQ) information in response to one or more transport blocks (TBs) in a transmitted physical sidelink shared channel (PSSCH) in a resource pool. The processor is configured to determine a sequence cyclic shift for the HARQ information in a physical sidelink feedback channel (PSFCH) transmission in the resource pool, wherein the sequence cyclic shift is determined according to a pre-configured or network configured initial cyclic shifting value.

In a fourth aspect of the present disclosure, a method for hybrid automatic repeat request (HARQ) reporting of a user equipment includes receiving a hybrid automatic repeat request (HARQ) information in response to one or more transport blocks (TBs) in a transmitted physical sidelink shared channel (PSSCH) in a resource pool and determining a sequence cyclic shift for the HARQ information in a physical sidelink feedback channel (PSFCH) transmission in the resource pool, wherein the sequence cyclic shift is determined according to a pre-configured or network configured initial cyclic shifting value.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In some embodiments of the present disclosure, a feasible way to provide multicast/broadcast services for applications such as vehicle-to-everything (V2X), internet of things (IoT), sports events (in and nearby stadiums), and/or even sometimes public safety/mission critical users is to allow radio resource control (RRC) idle and inactive UEs to receive data packets without any active connections. As such, two radio communication inefficiencies and challenges described above in the prior art for delivering data contents to UEs in idle/inactive states should be resolved.

In some embodiments of the present disclosure, in the present proposed hybrid automatic repeat request (HARQ) reporting determination and feedback sequence mapping scheme, for a sidelink packet transport block (TB) receiving UE (Rx-UE) sending ACK/NACK feedback to a packet TB transmitting UE (Tx-UE), it aims to resolve the above PSFCH capacity issue and the short processing time issue for the Rx-UE to generate and transmit HARQ reports by first adaptively determine whether or not the Rx-UE needs to provide a HARQ feedback report to the Tx-UE, selecting an appropriate bit sequence based on a sequence mapping scheme, and generating and transmitting the sequence in physical sidelink feedback channel (PSFCH). In order to accommodate multiple HARQ reports on the same set of time and frequency radio resources for PSFCH, a pseudo-random sequence is adopted for PSFCH to minimize the interference between them and at the same time multiplex ACK/NACK results for different SL communication cast types (unicast and groupcast), physical sidelink shared channel (PSSCH) transmissions in different slots and from multiple UEs.

Other benefits of using the HARQ reporting mechanism proposed in this disclosure include also the followings. From Rx-UE self-determination of ACK/NACK representation format, it will require a smaller number of information bits to be encoded in SCI and transmitted from the Tx-UE. And thus, resulting in better performance and more reliable PSCCH decoding can be achieved. Reduced number of required PSFCH sequences/resources to represent ACK/NACK information to the Tx-UE will allow the Rx-UE to transmit HARQ reports that are more important and necessary, without losing any ACK/NACK information or degrading sidelink communication performance. Reduced number of required PSFCH sequences/resources to represent ACK/NACK information to the Tx-UE will also allow the system to multiplex HARQ reports from more UEs, more slots and/or sidelink cast types within the same time and frequency radio resources.

Figure 1:
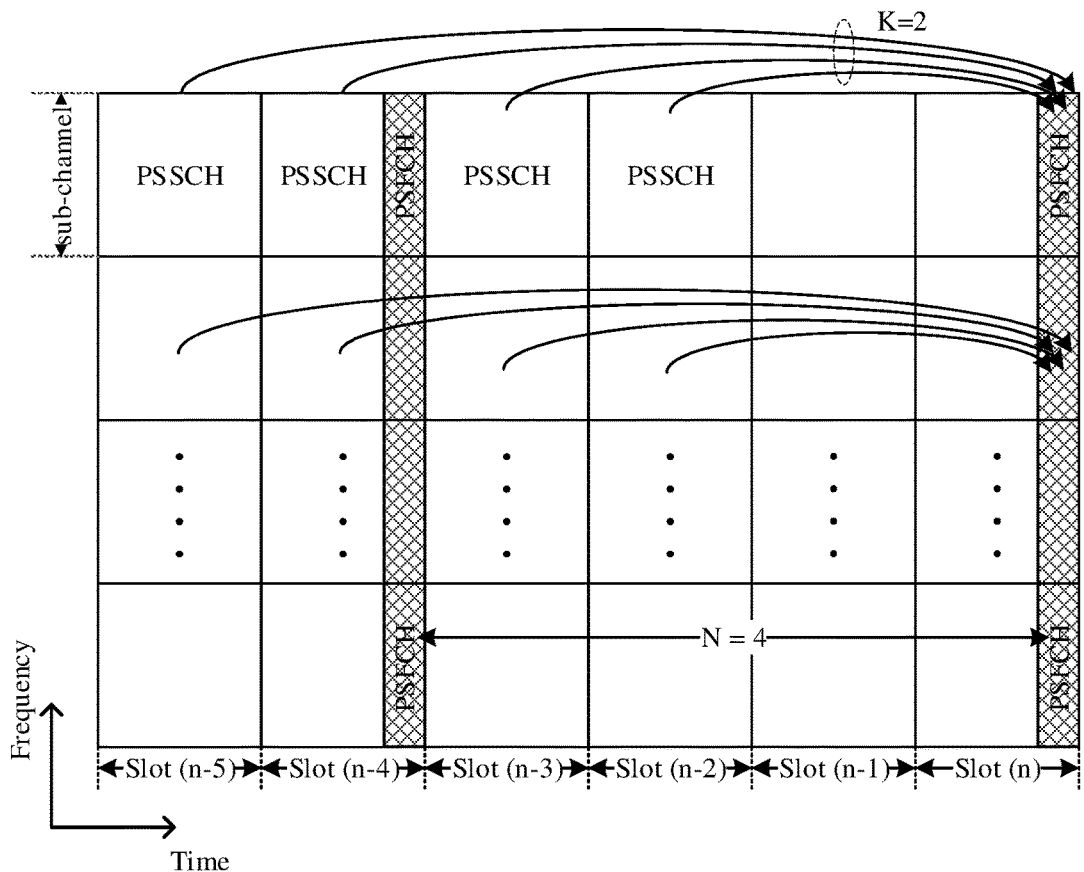
FIG. 1 is a schematic diagram illustrating an example illustration of physical sidelink feedback channel (PSFCH) resources configured in a resource pool with N equal to 4 and K equal to 2.
Figure 2:
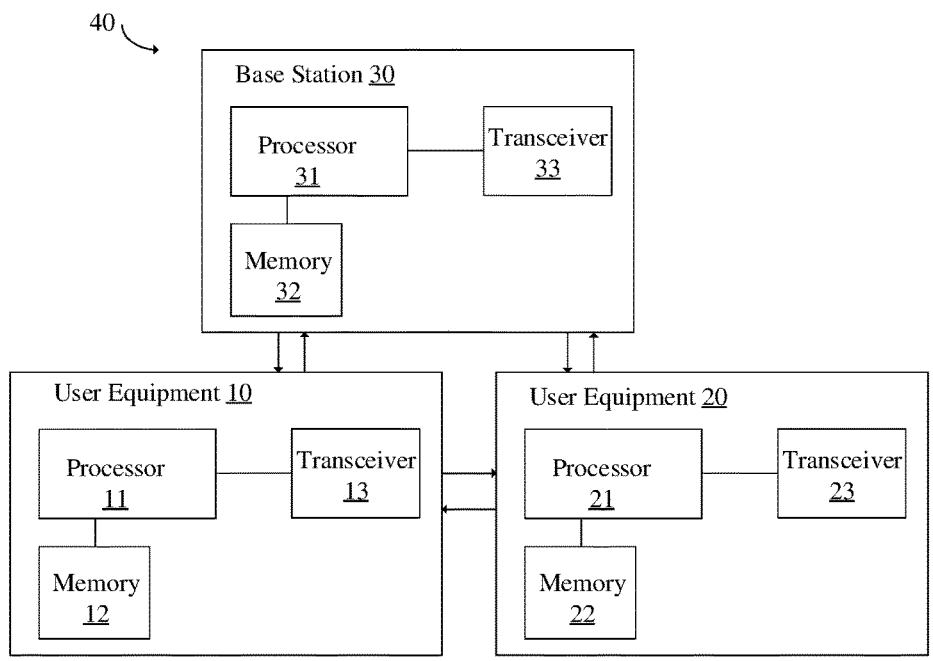
FIG. 2 is a block diagram of one or more user equipments (UEs) and a base station of communication in a communication network system according to an embodiment of the present disclosure.

FIG. 2 illustrates that, in some embodiments, one or more user equipments (UEs) 10, one or more user equipments (UEs) 20, and a base station 30 of communication in a communication network system 40 according to an embodiment of the present disclosure are provided. The communication network system 40 includes one or more UEs 10, one or more UE 20, and the base station 30 (such as a gNB). The UE 10 may include a memory 12, a transceiver 13, and a processor 11 coupled to the memory 12 and the transceiver 13. The UE 20 may include a memory 22, a transceiver 23, and a processor 21 coupled to the memory 22 and the transceiver 23. The base station 30 may include a memory 32, a transceiver 33, and a processor 31 coupled to the memory 32 and the transceiver 23. The processor 11 or 21 or 31 may be configured to implement proposed functions, procedures and/or methods described in this description. Layers of radio interface protocol may be implemented in the processor 11 or 21 or 31. The memory 12 or 22 or 32 is operatively coupled with the processor 11 or 21 or 31 and stores a variety of information to operate the processor 11 or 21 or 31. The transceiver 13 or 23 or 33 is operatively coupled with the processor 11 or 21 or 31, and transmits and/or receives a radio signal.

The processor 11 or 21 or 31 may include application-specific integrated circuit (ASIC), other chipset, logic circuit and/or data processing device. The memory 12 or 22 or 32 may include read-only memory (ROM), random access memory (RAM), flash memory, memory card, storage medium and/or other storage device. The transceiver 13 or 23 or 33 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 or 32 and executed by the processor 11 or 21 or 32. The memory 12 or 22 or 32 can be implemented within the processor 11 or 21 or 31 or external to the processor 11 or 21 or 31 in which case those can be communicatively coupled to the processor 11 or 21 or 31 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface.

Some embodiments of the present disclosure relate to sidelink communication technology in 3GPP NR release 16 and beyond. Some embodiments of the present disclosure relate to mobile cellular communication technology in 3GPP NR Release 16 and beyond for providing multicast and broadcast services.

In some embodiments, the UE 10 may be a sidelink packet transport block (TB) receiving UE (Rx-UE). The UE 20 may be a packet TB transmitting UE (Tx-UE). The sidelink packet transport block (TB) Rx-UE is configured to send ACK/NACK feedback to the packet TB Tx-UE.

In some embodiments, the processor 11 is configured to determine a hybrid automatic repeat request (HARQ) information in response to one or more transport blocks (TBs) in a received physical sidelink shared channel (PSSCH) in a resource pool. The processor 11 is configured to select a sequence cyclic shift for the HARQ information in a physical sidelink feedback channel (PSFCH) transmission in the resource pool, wherein the sequence cyclic shift is generated according to a pre-configured or network configured initial cyclic shifting value. This can solve issues in the prior art, require a smaller number of information bits to be encoded, require reduced number of required sequences to represent ACK/NACK information, provide better user experience, provide a good communication performance, and/or provide high reliability.

In some embodiments, the transceiver 23 is configured to receive a hybrid automatic repeat request (HARQ) information in response to one or more transport blocks (TBs) in a transmitted physical sidelink shared channel (PSSCH) in a resource pool. The processor 21 is configured to determine a sequence cyclic shift for the HARQ information in a physical sidelink feedback channel (PSFCH) reception in the resource pool, wherein the sequence cyclic shift is generated according to a pre-configured or network configured initial cyclic shifting value. This can solve issues in the prior art, require a smaller number of information bits to be encoded, require reduced number of required sequences to represent ACK/NACK information, provide better user experience, provide a good communication performance, and/or provide high reliability.

Figure 3:
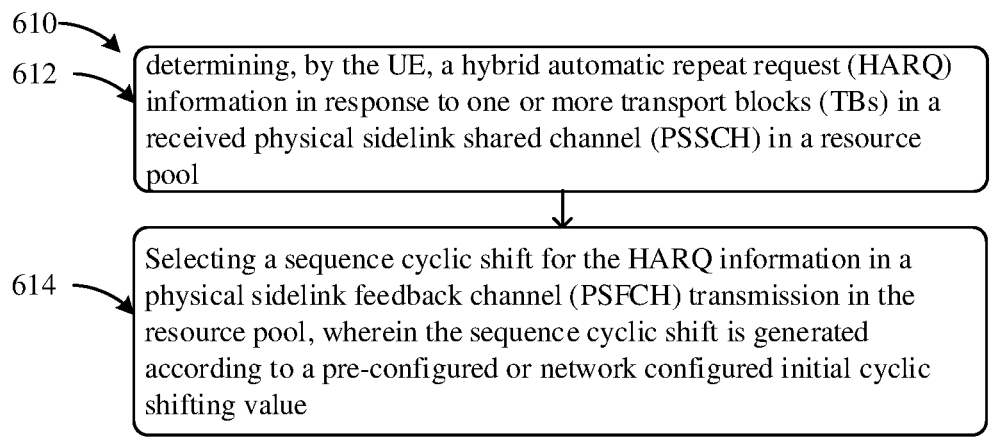
FIG. 3 is a flowchart illustrating a method for hybrid automatic repeat request (HARQ) reporting of a UE according to an embodiment of the present disclosure.

FIG. 3 illustrates a method 610 for hybrid automatic repeat request (HARQ) reporting of a user equipment according to an embodiment of the present disclosure.

In some embodiments, the method 610 includes: a block 612, determining, by the UE, a hybrid automatic repeat request (HARQ) information in response to one or more transport blocks (TBs) in a received physical sidelink shared channel (PSSCH) in a resource pool, and a block 614, selecting a sequence cyclic shift for the HARQ information in a physical sidelink feedback channel (PSFCH) transmission in the resource pool, wherein the sequence cyclic shift is generated according to a pre-configured or network configured initial cyclic shifting value. This can solve issues in the prior art, require a smaller number of information bits to be encoded, require reduced number of required sequences to represent ACK/NACK information, provide better user experience, provide a good communication performance, and/or provide high reliability.

Figure 4:
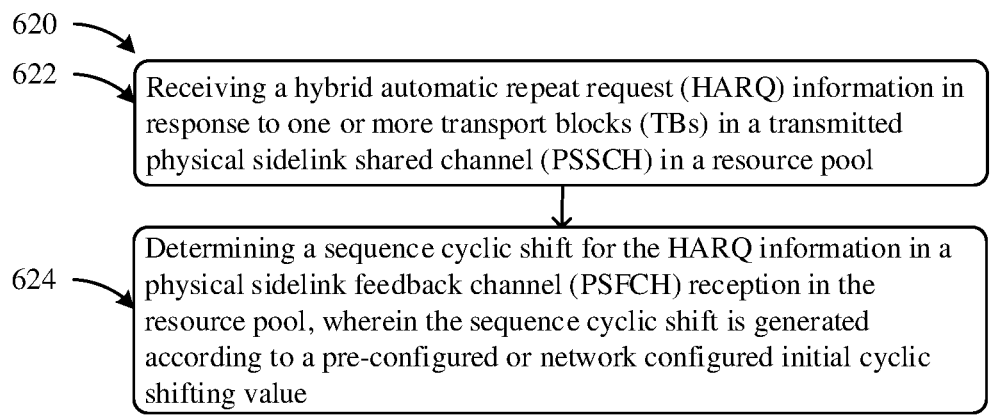
FIG. 4 is a flowchart illustrating a method for HARQ reporting of a UE according to another embodiment of the present disclosure.

FIG. 4 illustrates a method 620 for hybrid automatic repeat request (HARQ) reporting of a user equipment according to another embodiment of the present disclosure.

In some embodiments, the method 620 includes: a block 622, receiving a hybrid automatic repeat request (HARQ) information in response to one or more transport blocks (TBs) in a transmitted physical sidelink shared channel (PSSCH) in a resource pool, and a block 624, determining a sequence cyclic shift for the HARQ information in a physical sidelink feedback channel (PSFCH) reception in the resource pool, wherein the sequence cyclic shift is generated according to a pre-configured or network configured initial cyclic shifting value. This can solve issues in the prior art, require a smaller number of information bits to be encoded, require reduced number of required sequences to represent ACK/NACK information, provide better user experience, provide a good communication performance, and/or provide high reliability.

In some embodiments, a cyclic shift of the sequence cyclic shift is based on a slot position. In some embodiments, the processor 11 is configured to decode an associated sidelink control information (SCI) scheduling the received PSSCH, and the SCI comprises a HARQ feedback indicator for enabling or disabling a HARQ feedback reporting of the HARQ information from the UE 10.

In some embodiments, the HARQ information is given in a positive acknowledgement (ACK)/negative acknowledgement (NACK) representation format comprising a full format of ACK or NACK, or a reduced format of ACK-only or NACK-only.

In some embodiments, the processor 11 is configured to determine whether to perform the HARQ feedback reporting in PSFCH based on a network configuration or pre-configuration of PSFCH transmission resources in the resource pool, and the network configuration or pre-configuration of PSFCH in the resource pool indicates presence and allocation of time and frequency resources for the HARQ feedback reporting.

In some embodiments, if no PSFCH resource is network configured or pre-configuration in the same resource pool of the received PSSCH, the processor 11 determines that the HARQ feedback reporting in PSFCH is not needed from the UE 10 in the resource pool.

In some embodiments, the processor 11 is configured to determine whether to perform the HARQ feedback reporting for the received PSSCH is based on the HARQ feedback indicator in the associated SCI.

In some embodiments, the processor 11 is configured to determine whether to perform the HARQ feedback reporting for the received PSSCH is based on a PSSCH decoding result, a HARQ feedback option, a sidelink cast type, and/or the ACK/NACK representation format.

In some embodiments, the HARQ feedback indicator is determined according to a sidelink cast type. In some embodiments, when the sidelink cast type is broadcast, the HARQ feedback indicator in the SCI is set to disabled.

In some embodiments, when the sidelink cast type is unicast or groupcast, the HARQ feedback indicator in the SCI is set to enabled. In some embodiments, the processor 11 is configured to determine whether to perform the HARQ feedback reporting for the received PSSCH is based on the ACK/NACK representation format.

In some embodiments, a selection or determination of the ACK/NACK representation format is based on a network configuration or pre-configuration for the resource pool, an indication in the associated SCI, a sidelink cast type, a group size of a groupcast, or a combination of two or more of the foregoing.

In some embodiments, when the ACK/NACK representation format is based on the indication in the associated SCI, the transceiver 13 provides the HARQ feedback reporting following the indicated ACK/NACK representation format.

In some embodiments, the sidelink cast type comprises at least one of unicast, groupcast, connection-less groupcast, or connection-oriented groupcast.

In some embodiments, for the groupcast, either the full format or the reduced format is used, a selection of which format to use is based on a group size of the groupcast and/or an indication in the associated SCI.

In some embodiments, when the group size of the groupcast is known, the processor 11 selects the full format of ACK or NACK. In some embodiments, when the group size of the groupcast is not known, the processor 11 selects the reduced format of ACK-only or NACK-only.

In some embodiments, when the group size of the groupcast is larger than a pre-define/fixed value or number of candidate PSFCH resources, the processor 11 follows the indicated ACK/NACK representation format in the associated SCI or selects the reduced format of ACK-only or NACK-only.

In some embodiments, a determination of the sidelink cast type for the received PSSCH is based on a destination ID provided in the associated SCI, an indication in the associated SCI, and/or a group size of a groupcast.

In some embodiments, a unicast is determined based on the destination ID or the indication in the associated SCI.

In some embodiments, in the full format, an ACK is fed back from the transceiver 13 for a TB that is successfully decoded, and a NACK is fed back from the transceiver 13 for a TB that has failed to be decoded.

In some embodiments, if the reduced format comprising NACK-only is selected or indicated, the transceiver 13 transmits a HARQ feedback report in PSFCH only when decoding of the received PSSCH is a failure.

In some embodiments, when the processor 11 determines to perform the HARQ feedback reporting for the received PSSCH, the processor 11 selects the sequence cyclic shift according a PSSCH decoding result for the indicated or determined ACK/NACK representation format.

In some embodiments, the sequence cyclic shift adopts a length-12 pseudo-random sequence.

In some embodiments, the sequence cyclic shift is denoted as PSFCH format 0.

In some embodiments, the length-12 pseudo-random sequence fits within one resource block (RB).

In some embodiments, the transceiver 13 is configured to transmit the HARQ information in a PSFCH transmission.

In some embodiments, in the present disclosure of a proposed hybrid automatic repeat request (HARQ) reporting determination and feedback sequence mapping scheme, for a first user equipment (UE) engaging in new radio sidelink (NR-SL) communication with at least one second UE, the both first and second UEs receive SL resource pool configuration details from either network configuration or pre-configuration (e.g. via subscriber identity module (SIM) card) containing physical sidelink feedback channel (PSFCH) and HARQ feedback related information. Beside a periodicity of PSFCH occurrence (N) within a resource pool and a minimum time gap (K) between a physical sidelink shared channel (PSSCH) transmission and its associated PSFCH for HARQ reporting, the pre-configuration or network configuration information additionally includes at least one of the following parameters.

HARQ reporting enabling/disabling: a resource pool wide parameter that controls whether HARQ reporting is allowed for all UEs operating within the resource pool. When this parameter is set to disabled, HARQ reporting over PSFCH within the resource pool is strictly not allowed for all UEs. When this parameter is set to enabled, it is still allowed for a SL transport block (TB) transmitting UE (Tx-UE) to dynamically turn on or off HARQ reporting from a receiving UE (Rx-UE) for a particular PSSCH transmission.

For example, a Tx-UE may choose to disable HARQ reporting in sidelink control information (SCI), even when HARQ reporting is enabled by pre-configuration or network configuration for the resource pool, for packet TBs that have low latency requirement and choose to perform blind retransmissions instead of waiting for HARQ feedback from the Rx-UE. Another example for a Tx-UE to disable HARQ reporting in SCI when PSSCH (re)transmission for a SL TB has reached its maximum number of retransmissions and HARQ reporting from the Rx-UE in this case is no longer useful to the Tx-UE.

Number of TBs: this parameter determines number of TBs that a Rx-UE should provide its ACK/NACK feedback reports. When this parameter is set to 1 TB, a Rx-UE can provide HARQ report in PSFCH to carry 1 bit only, representing ACK or NACK. This may set a restriction on how many TBs that can be transmitted by the Tx-UE per PSSCH. When this parameter is set to 2 TBs, Rx-UE needs to provide HARQ report in PSFCH to carry 2 bits per PSSCH, even when Tx-UE transmits only 1 TB in the corresponding PSSCH. This parameter subsequently also determines the number of PSFCH sequences and sequence positions that a Rx-UE uses for reporting ACK and NACK feedback.

ACK/NACK representation format: this parameter in the resource pool pre-configuration or network configuration indicates a full or reduced representation of ACK and/or NACK feedback. A full representation of ACK and NACK information means ACK and NACK are separately indicated for every TB. When a reduced representation is pre-configured or network configured, this means either ACK-only or NACK-only should be reported per TB to the Tx-UE.

For example, when a Tx-UE transmit one TB and this parameter is pre-configured or network configured to be reduced representation, a Rx-UE will feedback an ACK to the Tx-UE when the TB is successfully decoded and provide no feedback when decoding failed. From Tx-UE's perspective, it will interpret a NACK for the transmitted TB in the absence of any a HARQ report from the Rx-UE. Therefore, not sending a HARQ report from the Rx-UE has the same effect of sending a NACK to the Tx-UE. In either case, the Tx-UE needs to re-send the TB.

Pseudo-random sequence cyclic shifting initial position/value (CS_init): this parameter determines the initial cyclic shift for the pseudo-random sequence to represent an ACK or a NACK. The actual cyclic shift to be used for mapping ACK/NACK information could be further dependent on the slot position.

In some embodiments, for the scenario where a first UE engages in NR-SL communication with at least one second UE and the first UE, a Tx-UE, transmits one or more TBs in PSSCH to the second UE, a Rx-UE, and enables HARQ reporting in sidelink control information (SCI) requesting ACK/NACK feedback from the Rx-UE for the transmitted PSSCH, the said Rx-UE first determines whether HARQ reporting is needed for the received TB(s) in PSSCH based on at least one of the following information and/or results. Optionally, the SCI comprises SCI format 2-A. SCI format 2-A is used for the decoding of PSSCH, with HARQ operation when HARQ-ACK information includes ACK or NACK, or when HARQ-ACK information includes only NACK. HARQ feedback enabled/disabled indicator is transmitted by means of the SCI format 2-A. Optionally, the SCI comprises SCI format 2-B. SCI format 2-B is used for the decoding of PSSCH, with HARQ operation when HARQ-ACK information includes only NACK. HARQ feedback enabled/disabled indicator is transmitted by means of the SCI format 2-B.

Pre-configuration or network configuration of PSFCH in a sidelink resource pool to indicate the presence and allocation of time and frequency radio resources for HARQ reporting. If no PSFCH resource is pre-configured or network configured in the same SL resource pool as the received PSSCH, this indicates to the Rx-UE that HARQ reporting to the Tx-UE for the received TB(s) in PSSCH is not necessary.

Pre-configuration or network configuration of HARQ reporting for the sidelink resource pool where the TB(s) in PSSCH is received. When this pre-configuration or network configuration is set to disabled, the Rx-UE can at least based on this setting to determine that HARQ reporting is not necessary for all received PSSCH in the same SL resource pool. When this pre-configuration or network configuration is set to enabled, this indicates to the Rx-UE that HARQ reporting is at least allowed in the resource pool. The actual determination of HARQ reporting is still subject to other information and/or results.

HARQ feedback indication in SCI. The said PSSCH TB(s) transmitting Tx-UE, the first UE, can choose to enable or disable HARQ feedback from the Rx-UE and indicate this selection in SCI. The Rx-UE then based on this indication and possibly other information and results to determine if HARQ reporting is necessary or not for the received PSSCH. When this HARQ feedback indication is set to disabled in SCI by the said Tx-UE, the Rx-UE provides no ACK or NACK feedback for the received PSSCH TB(s) to the Tx-UE. When it is enabled, the Rx-UE is allowed to provide ACK and/or NACK feedback to the Tx-UE. However, the final determination of HARQ reporting from the Rx-UE are based on other factors as well, such as PSSCH decoding result, HARQ feedback option, SL cast type, and/or ACK/NACK representation format.

In some embodiments, the Tx-UE may choose to enable or disable this HARQ feedback indication in SCI based on one or more of the following scenarios. Sidelink cast type: when the SL cast type is broadcast, the Tx-UE should set HARQ reporting parameter in the SCI to disabled. When the SL cast type is unicast or groupcast, the Tx-UE can set HARQ reporting parameter in the SCI to enabled. Congestion level of the resource pool: when channel busy ratio (CBR) measurement level for the SL resource pool is above a certain level (e.g. 80%), the Tx-UE may choose enable HARQ feedback to reduce its rate of SL transmission. Maximum number of (re)transmissions is reached for a TB. As described earlier, when the number of (re)transmissions for a TB has reached its maximum allowed or pre-configured or network configured value, it does not matter if Rx-UE provides an ACK or a NACK response for the received TB. The Tx-UE is simply not allowed to retransmit again the same TB to the Rx-UE. As such, the Tx-UE will disable the HARQ reporting in this case. Transmitted PSSCH TB(s) has a short latency requirement. As described earlier, sometimes it may not be feasible for the Tx-UE to wait for HARQ report every time a SL TB is transmitted before it is able to perform the retransmission of the same TB, due to short latency requirement. Therefore, the Tx-UE will choose to perform back-to-back retransmissions of the same TB and disable the HARQ reporting in this case.

ACK/NACK representation format. As described earlier, ACK/NACK representation format can be either a full format or a reduced format (ACK-only or NACK-only). The selection or determination of the format can be based on pre-configuration or network configuration for the resource pool in which the PSSCH TB(s) is received, direct indication from the Tx-UE, sidelink cast type, group size of a groupcast session, or a combination of two or more of these methods. When the ACK/NACK representation format is pre-configured or network configured for the SL resource pool in which the PSSCH TB(s) is received, the Rx-UE follows the (pre-)configured information in determining the format it will use for HARQ reporting. When the ACK/NACK representation format is directly indicated from the Tx-UE, for example in SCI, the Rx-UE follows the indicated format. Alternatively, the ACK/NACK representation format is derived based on sidelink cast type. That is, the full format (ACK and NACK) should be used when the sidelink cast type for the received PSSCH TB(s) is determined to be a unicast and the reduced format with NACK-only should be used for a connection-less groupcast. For a connection-oriented groupcast, either the full format or the reduced format (NACK-only or ACK-only) should be used, and the determination of which format to use could be based on the group size of the connection-oriented groupcast and/or direct indication from the Tx-UE (e.g. in SCI). That is, when the group size is known, the Rx-UE in default uses the full format. But when the group size is larger than a pre-define/fixed value (e.g. 5 or 6 members in a group) or number of available/candidate PSFCH resources, the Rx-UE follows the indicated format from the Tx-UE (e.g. in SCI) or the Rx-UE switches to the reduced format, and this could be NACK-only or ACK-only.

In some embodiments, the determination of sidelink cast type (unicast, connection-less groupcast and connection-oriented groupcast) for the received PSSCH TB(s) at the Rx-UE could be based on destination ID associated with the received PSSCH TB(s), direct indication from the Tx-UE in SCI, and/or the group size of a groupcast.

For example, a unicast session could be determined based on direct indication in SCI. A connection-less groupcast could be determined based on a fixed destination ID given by higher layer, or a combination of direct indication from the Tx-UE (e.g. indicating this is a groupcast in SCI) and the absence of a group size for this groupcast communication. A connection-oriented groupcast could be determined based on a destination ID given by higher layer, or a combination of direct indication from the Tx-UE (e.g. indicating this is a groupcast in SCI) and the knowledge of a group size for this groupcast communication.

If the ACK/NACK representation format is determined to be:

Full format: An ACK should be fed back from the Rx-UE for a TB that is successfully decoded, and a NACK should be fed back for a TB that failed to be decoded. This full format of ACK/NACK representation is very useful in SL unicast communication besides providing just a HARQ report to the Tx-UE. In the absence of a HARQ report from the Rx-UE (commonly known as a discontinued transmission (DTX) state), the Tx-UE is then able to determine the Rx-UE could not even decode the SCI transmitted in physical sidelink control channel (PSCCH). As such, this can provide an indication to the Tx-UE that the radio link condition at least seen from the Rx-UE is deteriorating and that it may need to declare radio link failure if continuing to receive no HARQ reports from the Rx-UE and terminate the unicast session. If Tx-UE always received NACK from the Rx-UE, it can use this information to adjust its modulation and coding scheme (MC S) selection for future transmission to the Rx-UE.

Reduced format of NACK-only: If the NACK-only representation format is determined or selected, the Rx-UE will feed back a HARQ report only when decoding of the received PSSCH TB(s) is a failure. For the cases when the received PSSCH TB(s) is decoded successfully or not able to decode SCI transmitted in PSCCH, the Rx-UE will not provide a HARQ report to the Tx-UE. This NACK-only representation format is useful for connection-less groupcast communication, where the group size is not known to the Tx-UE. Without knowing the group size, there is no motivation or purpose for the Tx-UE to count number of ACK and NACK feedbacks. The Tx-UE solely relies on receiving NACK feedback from any Rx-UE to determine whether or not to perform retransmission of PSSCH. One obvious benefit of this NACK-only representation format is a reduction of HARQ reports from Rx-UEs and at the same time a reduction in number of required PSFCH resources from not having to send ACK feedbacks.

Reduced format of ACK-only: Opposite to the NACK-only format, when the ACK-only representation format is determined or selected, the Rx-UE will feed back a HARQ report only for the successfully decoded PSSCH TB(s). Comparing to the NACK-only representation format, the ACK-only feedback from Rx-UEs will allow the Tx-UE to identify number of ACK reports received and subsequently determine whether a retransmission is needed or not. This is particularly useful for connection-oriented groupcast communication, where the group size is known to all member UEs in the same group. Similar to NACK-only representation format, this ACK-only format also provides benefits of reduction in number of HARQ reports from Rx-UEs and at the same time a reduction in number of required PSFCH resources. In the absence of an ACK report from a Rx-UE, the Tx-UE interprets this as a NACK and the corresponding PSSCH TB(s) should be retransmitted. Therefore, the overall performance is the same as the full representation format (ACK and NACK) and the number of required feedback resources (PSFCH) is reduced.

Further, once it is determined that a HARQ reporting is necessary for the received PSSCH TB(s), the Rx-UE selects a HARQ reporting sequence cyclic shift according to PSSCH decoding result(s) for the selected/determined ACK/NACK representation format. Note that, HARQ reporting sequence cyclic shifts are also referred to as PSFCH resources in the present disclosure. In order to accommodate multiple HARQ reports using the same set of time and frequency radio resources, the said HARQ reporting sequence cyclic shift adopts a length-12 pseudo-random sequence format, also to be denoted here as PSFCH format 0, to fit within one resource block (RB). Due to pseudo-random nature of the sequence, it has an orthogonal characteristic when the sequence is cyclic shifted. That is, the sequence has a zero cross-correlation property between all cyclic shifted version of itself, in theory. It is due to such zero cross-correlation property of the sequence, the interference between different HARQ reports transmitted on the same set of time and frequency radio resources can be minimized. As such, the pseudo-random sequence and cyclic shifting of the sequence are utilized here to multiplex HARQ reports in the same RB for different PSSCH TB s, PSSCH transmissions in different slots and from multiple Rx-UEs, and it would still be decodable at the PSSCH TB(s) transmitting Tx-UE.

Figure 5:
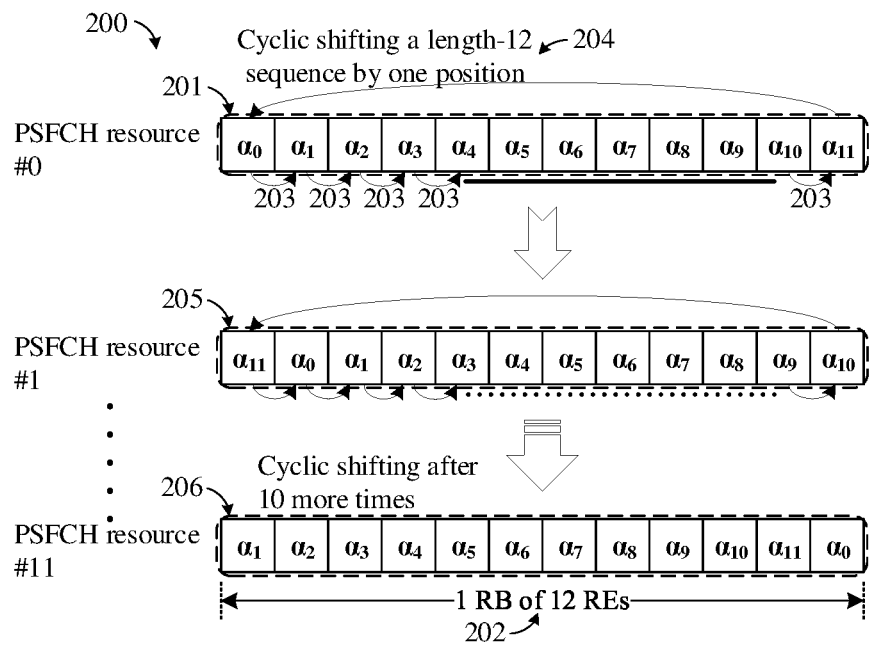
FIG. 5 is a schematic diagram illustrating an exemplary illustration of a length-12 HARQ reporting sequence ($\alpha 0, \alpha 1, \alpha 2, \ldots, \alpha 11$) occupying all 12-resource element (RE) positions within a resource block (RB) according to an embodiment of the present disclosure.

FIG. 5 illustrates an exemplary illustration of a length-12 pseudo-random sequence ($\alpha 0, \alpha 1, \alpha 2, \ldots, \alpha 11$) for HARQ reporting and occupying all 12-resource element (RE) positions within a resource block (RB) according to an embodiment of the present disclosure. In reference to diagram 200 in FIG. 5, an exemplary illustration of a length-12 pseudo-random sequence ($\alpha_0, \alpha_1, \alpha_2, \ldots, \alpha_{11}$) 201 for HARQ reporting and occupying all 12 resource element (RE) positions within a RB 202 is depicted. Let's denote this initial sequence as PSFCH resource #0. As stated earlier, cyclic shifting of the length-12 sequence is needed to multiplex different HARQ reports and the process of cyclic shifting is performed by "shifting" each element within the sequence starting from the first element by one position 203 and the last element is then "shifted" to the first position 204. Once it is cyclic shifted by one position, a new sequence (PSFCH resource #1) is created in 205, which can be used for carrying/representing a different HARQ report. Since the length of the sequence is 12, the sequence can be cyclic shifted 10 more time to create 10 more PSFCH resources. In total, there would be 12 PSFCH resources available to carry/represent 12 different HARQ reports. The last PSFCH resource (#11) is illustrated in 206. For an example of one-TB transmission, a resource pool could be pre-defined/fixed with one of the 12 cyclic shifted sequences to represent NACK information. Since it requires only 1 bit to represent ACK/NACK feedback information for one TB, the other sequence to represent ACK would be cyclic shifted by length-12/2 HARQ possibilities (ACK/NACK)=6 (cyclic shift gap). As such, if the initial sequence cyclic shift for NACK is 0, then the sequence cyclic shift for ACK would be 6. For another example with two-TB transmission, where a Rx-UE needs to feedback ACK/NACK information for both TBs, 2 bits with 4 different combinations (00, 01, 10, 11) are needed. This means 4 cyclic shifted sequences would be required in this case and each sequence should be cyclic shifted 3 times (cyclic shift gap=3) from the previous sequences. This means, if the pre-defined/fixed initial cyclic shift for the ACK/NACK combination {00} is 0, then the sequence cyclic shifts for the remaining ACK/NACK combinations {01}, {11} and {10} would be 3, 6 and 9, respectively. In order to align Rx- and Tx-UE's understanding on HARQ reporting sequence mapping for the determined ACK/NACK representation format, a mapping rule of PSSCH decoding results (HARQ=0 and HARQ=1) to PSFCH resources (sequence cyclic shifts for HARQ reporting) is needed. In the following, methods for this mapping are described.

Figure 6:
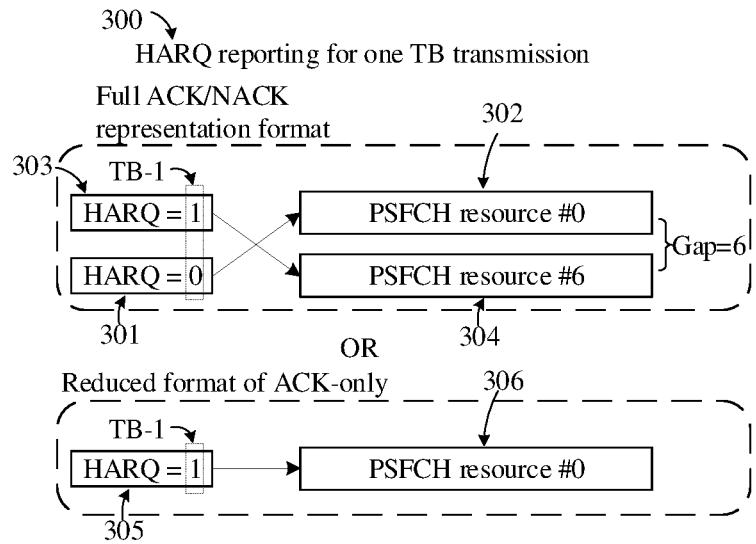
FIG. 6 is a schematic diagram illustrating an exemplary illustration of 1 HARQ bit (for 1 transport block) mapping to PSFCH resources for both full and reduced ACK/NACK representation formats according to an embodiment of the present disclosure.

FIG. 6 illustrates an exemplary illustration of 1 HARQ bit (for 1 transport block) mapping to PSFCH resources for both full and reduced ACK/NACK representation formats according to an embodiment of the present disclosure. For the case of HARQ reporting of 1 bit only (ACK or NACK) for a received PSSCH TB, an exemplary illustration of mapping between the HARQ bit to PSFCH resources is shown in diagram 300 of FIG. 6 for both full and reduced (ACK-only) representation formats. If the ACK/NACK representation is determined to be based on a full format (both ACK and NACK), two HARQ states (0 and 1) will need to be individually mapped to a PSFCH resource. In the provided exemplary illustration in diagram 300 of FIG. 6, the initial sequence cyclic shift for the HARQ reporting to represent NACK in 301 is determined to be PSFCH resource #0 in 302. As described previously, this determination could be based on pre-configuration or network configuration, or pre-defined/fixed for a resource pool. As part of full ACK/NACK representation format mapping, cyclic shift separation/distance between ACK and NACK sequences should be as large as possible to maximize sequence orthogonality after channel fading, and thus improving energy detection performance at the receiver (Tx-UE). Since there are only two HARQ states for one TB and 12 possible cyclic shift sequence positions, ACK (HARQ=1) in 303 is mapped to PSFCH resource #6 in 304 with a gap of 6 positions from NACK. For the reduced representation format, the Rx-UE signals only one sequence for the received PSSCH TB when it is decoded successfully. In the absence of NACK, the Tx-UE will interpret PSSCH decoding at the Rx-UE has failed. Even if PSCCH was not detected/decoded successful at the Rx-UE, discontinued transmission (DTX) should also be treated as failed and that retransmission of the same TB would be needed. Therefore, theoretically it is not necessary to feedback any NACK report to the Tx-UE. This will minimize number of required PSFCH sequences per UE and to reduce processing complexity at Tx-UE. And thus, it will be able to multiplex HARQ reports from more UEs within the same set of PSFCH resources. For the reduced representation format of ACK-only, since there is only one HARQ state (HARQ=1), the HARQ reporting sequence mapping simply follows the pre-configuration or network configuration, or pre-defined/fixed for a resource pool. In the provided exemplary illustration in 300, the initial sequence cyclic shift for the HARQ reporting to represent the reduced format of ACK-only in 305 is determined to be PSFCH resource #1 in 306.

Figure 7:
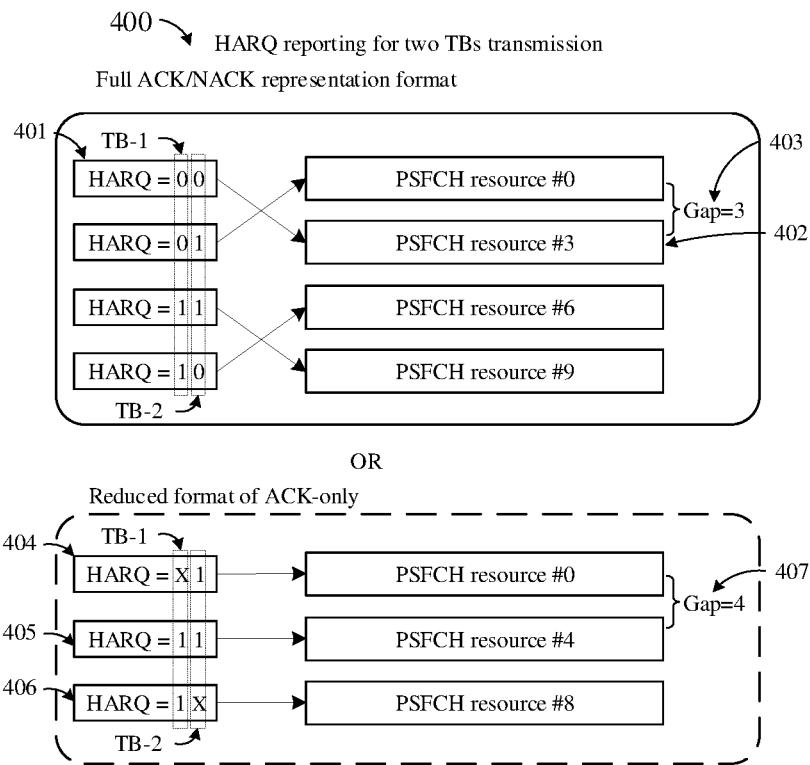
FIG. 7 is a schematic diagram illustrating an exemplary illustration of 2 HARQ bits (for 2 TBs) mapping to PSFCH resources for both full and reduced ACK/NACK representation formats according to an embodiment of the present disclosure.

FIG. 7 is a schematic diagram illustrates an exemplary illustration of 2 HARQ bits (for 2 TBs) mapping to PSFCH resources for both full and reduced ACK/NACK representation formats according to an embodiment of the present disclosure. For the case of reporting 2 HARQ bits for 2 TBs (1 ACK/NACK bit per TB), an exemplary illustration of mapping between the HARQ bits to PSFCH resources is shown in diagram 400 of FIG. 7 for both full and reduced (ACK-only) representation formats. If the ACK/NACK representation is determined to be based on a full format (both ACK and NACK for each TB), four HARQ states (00, 01, 11 and 10) will need to be individually mapped to a PSFCH resource. In the provided exemplary illustration in diagram 400 of FIG. 7, the initial sequence cyclic shift for the HARQ reporting to represent NACK for TB-1 and NACK for TB-2 (HARQ=0 0) in 401 is determined to be PSFCH resource #3 in 402. This determination could be based on pre-configuration or network configuration, or pre-defined/fixed for a resource pool. Following the same design principle of maximizing the distance/separation between ACK/NACK sequences for the four HARQ states, then the PSFCH resource gap between different HARQ states would be 3 in 403. As such, the mapping of remaining 3 HARQ states could be done as HARQ (0 1) is mapped to PSFCH resource #0, HARQ (1 1) is mapped to PSFCH resource #9, and HARQ (1 0) is mapped to PSFCH resource #6. If the ACK/NACK representation is determined to be based on a reduced format of ACK-only, the Rx-UE signals one of three possible sequences for the two received PSSCH TBs in 404, 405, or 406, where HARQ=1 for a TB means PSSCH decoding result is successful (ACK) and HARQ=X for a TB means PSSCH decoding result is irrelevant, which could be either NACK or DTX. Since the reduced format requires 3 HARQ states to represent ACK-only result for two PSSCH TBs and in total there are 12 possible HARQ reporting sequences (PSFCH resources), the maximum distance/separation between ACK-only sequences for the three HARQ states would be 4 in 407.

Figure 8:
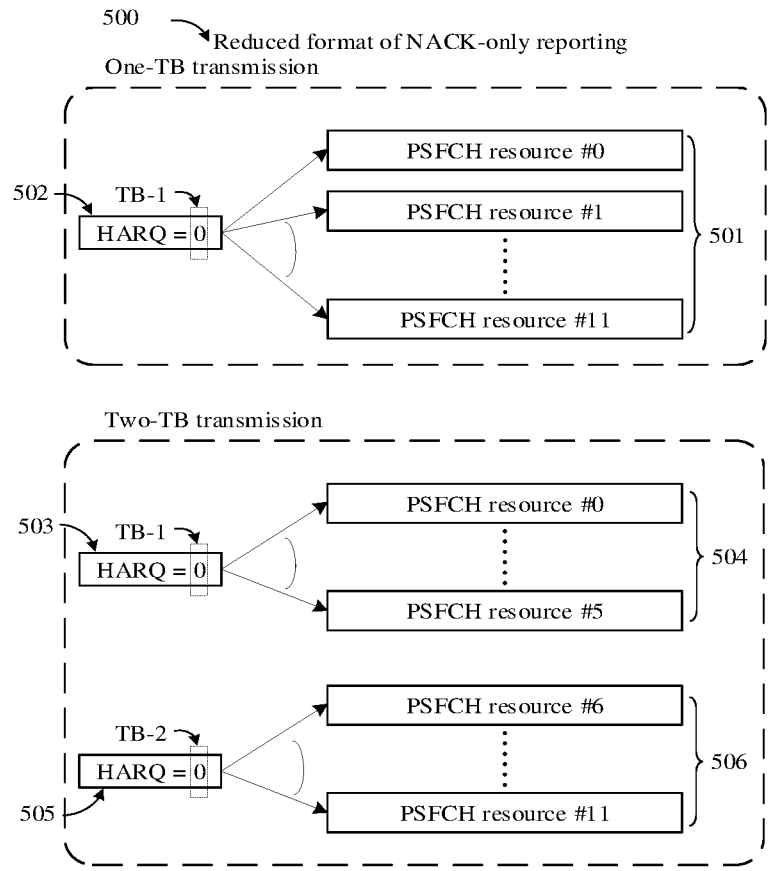
FIG. 8 is a schematic diagram illustrating an exemplary illustration of NACK-only HARQ bit mapping to PSFCH resources for both 1 and 2 TBs according to an embodiment of the present disclosure.

FIG. 8 illustrates an exemplary illustration of NACK-only HARQ bit mapping to PSFCH resources for both 1 and 2 TBs according to an embodiment of the present disclosure. For the case if the ACK/NACK representation is determined to be based on a reduced format of NACK-only, it is required for the Rx-UE to feedback its PSSCH decoding results using a fixed/pre-determined sequence cyclic shift (PSFCH resource) for HARQ reporting, as this reduced representation format is typically used for groupcast communication where the group size is not known to the Tx-UE or the group size is larger than a number of available/candidate PSFCH resources. Alternatively, if HARQ reporting transmission power from all Rx UEs are focused on one particular HARQ sequence cyclic shift/PSFCH resource, which may cause concern for interfering e with other HARQ sequence cyclic shifts/PSFCH resources for other TBs, slots and/or Tx-UEs, then the HARQ reporting sequence cyclic shift/PSFCH resource determination for the reduced format of NACK-only reporting could be based on a more random manner to distribute the transmission power from HARQ reporting Rx-UEs across a range/set of sequence cyclic shifts/PSFCH resources. The random selection process could be simply just a purely random selection among the range/set of sequence cyclic shifts or based on Rx-UE's UE_ID.

For example, the selection of a PSFCH resource for feeding back a NACK-only result is done by performing a mathematical modular function between UE_ID and the number of PSFCH resources within a set. In the provided exemplary illustration in diagram 500 of FIG. 8, NACK-only HARQ bit mapping to PSFCH resources for both 1 and 2 TBs are depicted. For the case of only one TB and the range/set of possible HARQ sequences/PSFCH resources is not restricted, the Rx-UE simply randomly selects a PSFCH resources among the 12 available resources in 501 when PSSCH decoding result is a NACK (HARQ=0) for the received TB in 502. For the case of two TBs, the range/set of HARQ sequences (PSFCH resources) that can be selected for each TB should be separated (i.e. not overlapped).

For example, NACK-only reporting for TB-1 in 503 could be restricted to a set of first 6 PSFCH resources from #0 to #5 in 504 and NACK-only reporting for TB-2 in 505 could be restricted to a set of second 6 PSFCH resources from #6 to #11 in 506. The selection of PSFCH resources among the restricted set could be purely random by the Rx-UE. Once the HARQ reporting sequence/PSFCH resource is selected, the Rx-UE generates the sequence and transmits to the Tx-UE via PSFCH.

In summary, in some embodiments, for a receiver UE (Rx-UE) receiving PSSCH transmission for one or more TB(s) from a transmitter UE (Tx-UE) in a NR sidelink communication, the Rx-UE receives resource pool pre-configuration or network configuration information for PSFCH transmission and resources, and HARQ reporting related details. These include at least one of the followings parameters: HARQ reporting enabling/disabling, number of TBs to be reported, ACK/NACK representation format, and/or pseudo-random sequence cyclic shifting initial position/value. Further, the Rx-UE determines if a HARQ feedback is necessary based on at least one of presence/pre-configuration or network configuration of PSFCH resources in the resource pool, pre-configuration or network configuration of HARQ reporting (enabled/disabled), HARQ feedback enabling setting in SCI (enabled/disabled), or ACK/NACK representation format.

Optionally, Tx-UE enables or disables HARQ feedback in SCI based on at least one of sidelink cast type (e.g. if destination ID is associated with broadcast, HARQ feedback is set to disabled in SCI. If destination ID is associated with unicast or groupcast, HARQ feedback is set to enabled in SCI), CBR measurement level (HARQ is disabled if higher than X %, e.g. X=80), maximum number of (re)transmissions is reached for a TB, or transmitted PSSCH TB(s) has a short latency requirement.

Optionally, in ACK/NACK representation format, if ACK/NACK representation format is pre-configured or network configured or indicated in SCI, the Rx-UE follows the pre-configuration or network configuration information or the indication in SCI. Alternatively, the Rx-UE determines the ACK/NACK representation format based on pre-configuration or network configuration, sidelink cast type, group size of a groupcast session, number of available/candidate PSFCH resources or a combination of two or more of these parameters.

In some embodiments, the Rx-UE selects a sequence cyclic shift for HARQ reporting according to the determined ACK/NACK representation format and PSSCH TB(s) decoding result, if it is determined necessary for the Rx-UE to feedback a HARQ report.

In addition, the selection of sequence cyclic shift for HARQ reporting can be further based on the transmitted number of transmitted TBs, pre-configured or network configured number of TBs for feedback per resource pool and/or member ID of the Rx-UE within a group (e.g. member sequence position or ID).

In some embodiments, the Rx-UE generates and transmits the selected sequence cyclic shift via PSFCH. Optionally, when the full ACK/NACK representation format is selected or determined, each ACK/NACK decoding result combination for the received PSSCH TB(s) are encoded by a unique sequence cyclic shift. If only one PSSCH TB is received, two sequence cyclic shifts are needed. One sequence cyclic shift is assigned to represent ACK and the other one sequence cyclic shift is assigned to represent NACK. If two PSSCH TBs are received, four sequence cyclic shifts are needed for HARQ reporting. One sequence cyclic shift is assigned to represent {ACK, ACK}, one sequence cyclic shift to represent {ACK, NACK}, one sequence cyclic shift to represent {NACK, NACK} and one sequence cyclic shift to represent {NACK, ACK}.

Optionally, when the reduced representation format of ACK-only is selected or determined, Rx-UE feeds back a HARQ report only when one or more received PSSCH TB(s) is decoded successfully. That is, only 1 unique sequence cyclic shift is needed for 1 PSSCH TB and 3 unique sequence cyclic shifts are needed for 2 PSSCH TBs. Optionally, when the reduced representation format of NACK-only is selected or determined, Rx-UE feeds back a HARQ report only when the decoding of the received PSSCH TB(s) is failure. The Rx-UE should randomly select or based on its UE_ID, UE member_ID or a fixed/pre-defined mapping to select a sequence cyclic shift for HARQ reporting of each received PSSCH TB.

Commercial interests for some embodiments are as follows. 1. Solving issues in the prior art. 2. Requiring a smaller number of information bits to be encoded. 3. Requiring reduced number of required sequences to represent ACK/NACK information. 4. Providing better user experience. 5. Providing good communication performance. 6. Providing high reliability. 7.

Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes.

Some embodiments of the present disclosure are a combination of "techniques/processes" that can be adopted in 3GPP specification to create an end product.

Figure 9:
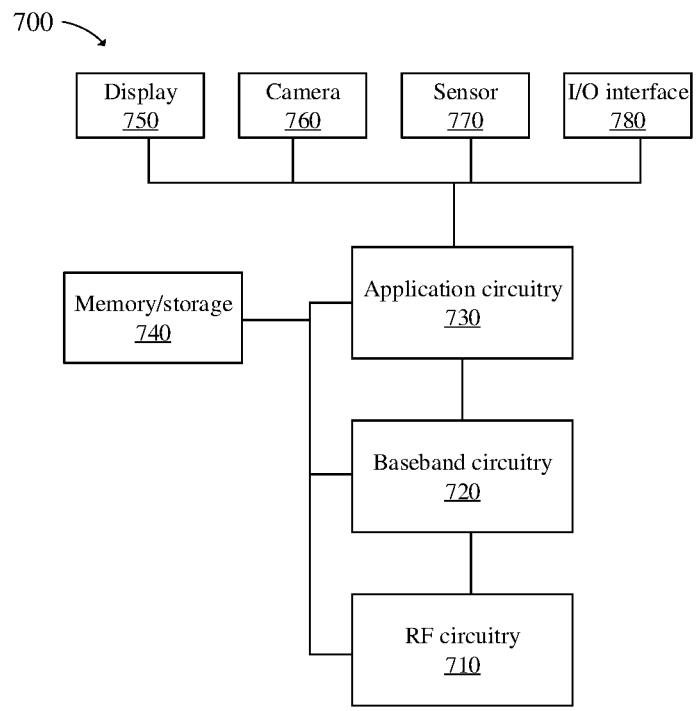
FIG. 9 is a block diagram of a system for wireless communication according to an embodiment of the present disclosure.'

FIG. 9 is a block diagram of an example system 700 for wireless communication according to an embodiment of the present disclosure.

Embodiments described herein may be implemented into the system using any suitably configured hardware and/or software. FIG. 9 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc.

In some embodiments, the baseband circuitry may provide for communication compatible with one or more radio technologies.

For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency.

For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium.

In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency.

For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality.

In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display.

In various embodiments, the system 700 may be a mobile computing device such as, but not limited to, a laptop computing device, a tablet computing device, a netbook, an ultrabook, a smartphone, a AR/VR glasses, etc.

In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments.

Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical embodiments, it is understood that the present disclosure is not limited to the disclosed embodiments but is intended to cover various arrangements made without departing from the scope of the broadest interpretation of the appended claims.

What is claimed is:

1. A method for hybrid automatic repeat request (HARQ) reporting of a user equipment (UE), comprising:
    determining, by the UE, a hybrid automatic repeat request (HARQ) information in response to one or more transport blocks (TBs) in a received physical sidelink shared channel (PSSCH) in a resource pool; and
    selecting a sequence cyclic shift for the HARQ information in a physical sidelink feedback channel (PSFCH) transmission in the resource pool, wherein the sequence cyclic shift is generated according to a pre-configured or network configured initial cyclic shifting value;
    wherein the method further comprises:
    decoding, by the UE, an associated sidelink control information (SCI) scheduling the received PSSCH, wherein the SCI comprises a HARQ feedback indicator for enabling or disabling a HARQ feedback reporting of the HARQ information from the UE, wherein the HARQ information is given in a positive acknowledgement (ACK)/negative acknowledgement (NACK) representation format comprising a full format of ACK or NACK, or a reduced format of ACK-only or NACK-only;
    determining, by the UE, whether to perform the HARQ feedback reporting for the received PSSCH is based on the HARQ feedback indicator in the associated SCI;
    wherein the HARQ feedback reporting for the received PSSCH is based on an ACK/NACK representation format;
    wherein a selection or determination of the ACK/NACK representation format is based on a group size of a groupcast that serves as a sidelink cast type;
    for the groupcast, either the full format or the reduced format is used, a selection of which format to use is based on the group size of the groupcast and/or an indication in the associated SCI;
    when the group size of the groupcast is known, the UE selects the full format of ACK or NACK; and
    when the group size of the groupcast is larger than a pre-define/fixed value or number of candidate PSFCH resources, the UE follows an ACK/NACK representation format indicated in the associated SCI or selects the reduced format of ACK-only or NACK-only.

2. The method of claim 1, wherein a cyclic shift of the sequence cyclic shift is based on a slot position.

3. The method of claim 1, wherein if no PSFCH resource is network configured or pre-configuration in the same resource pool of the received PSSCH, the UE determines that the HARQ feedback reporting in PSFCH is not needed from the UE in the resource pool.

4. The method of claim 1, wherein the HARQ feedback indicator is determined according to a sidelink cast type;
    when the sidelink cast type is broadcast, the HARQ feedback indicator in the SCI is set to disabled; and
    when the sidelink cast type is unicast or groupcast, the HARQ feedback indicator in the SCI is set to enabled.

5. The method of claim 1, wherein in the full format, an ACK is fed back from the UE for a TB that is successfully decoded, and a NACK is fed back from the UE for a TB that has failed to be decoded; and/or
    if the reduced format comprising NACK-only is selected or indicated, the UE transmits a HARQ feedback report in PSFCH only when decoding of the received PSSCH is a failure.

6. The method of claim 1, wherein when the UE determines to perform the HARQ feedback reporting for the received PSSCH, the UE selects the sequence cyclic shift according to a PSSCH decoding result for the indicated or determined ACK/NACK representation format.

7. The method of claim 6, wherein the sequence cyclic shift adopts a length-12 pseudo-random sequence, and the length-12 pseudo-random sequence fits within one resource block (RB).

8. The method of claim 6, wherein the sequence cyclic shift is denoted as PSFCH format 0.

9. A user equipment (UE), comprising:
    a memory;
    a transceiver; and
    a processor coupled to the memory and the transceiver;
    wherein instructions stored in the memory are executable by the processor to cause the user equipment to execute the method of claim 1.

* * * * *